Patented Jan. 10, 1933

1,893,543

UNITED STATES PATENT OFFICE

FRIEDRICH FELIX, OF BASEL, SWITZERLAND, ASSIGNOR TO THE FIRM SOCIETY OF CHEMICAL INDUSTRY IN BASLE, OF BASEL, SWITZERLAND

PROCESS FOR THE DYEING OF COLLOIDS OF THE CELLULOSE SERIES OF THE GROUP OF CELLULOSE ESTERS OR ETHERS FAST GREENISH YELLOW TINTS

No Drawing. Application filed December 4, 1929, Serial No. 411,693, and in Switzerland December 8, 1928.

This invention consists in dyeing colloids of the cellulose series of the group of the cellulose esters or ethers, whether in the form of textiles or in the form of lacquers or varnishes, with the azo-dyestuffs of the general formula

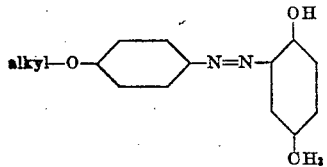

whereby shades are obtained which surpass in their greenish character and fastness to light the shades hitherto obtainable with the known comparable dyestuffs.

The following example illustrates the invention, the parts being by weight:—

*Example*

4-5 parts of the dyestuff of the formula

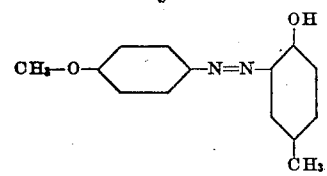

are dissolved in 1000 parts of finished nitrocellulose varnish. When the liquid thus obtained is coated in thin layers on various supports (metal, glass, leather, wood, celluloid, silk or the like) it leaves on drying a transparent covering, the intensely pure yellow color of which is fast to light. By incorporating suitable substances with the transparent varnish a matt or covering varnish may be produced.

Similar tints are obtained with the corresponding dyestuff from para-diazophenetol.

The dyeing of acetate silk or similar fibres is effected in the following manner:—

10 parts of the dyestuff of the formula

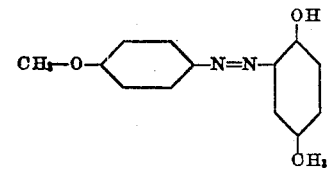

are mixed with a suitable dispersing agent, such as Turkey red oil, sulfite cellulose liquor or a sulfonation product of the residue from the manufacture of benzaldehyde and stirred to produce a uniform paste of 20 per cent. strength. One part of this paste is very intimately mixed with 10 parts of water at 50° C. and with so much of a concentrated soap solution that the dye-bath which is to be obtained from the mixture corresponds with a soap solution of 2 per mille strength. The whole is then diluted with cold water to about 300 parts. In the emulsion thus prepared 10 parts of acetate silk yarn are entered and handled therein; the bath is heated within ¾ hour to 75° C. and dyeing continued for about ¼ hour at this temperature. The silk is then rinsed and brightened as usual. There are obtained vivid green-yellow dyeings of very good fastness properties.

What I claim is:—

The process of dyeing the colloids of the cellulose series of the group of the cellulose esters and ethers which comprises treating them with the dyestuff of the formula

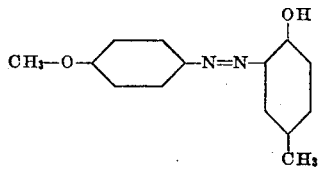

to produce greenish yellow tints which are fast particularly to light.

In witness whereof I have hereunto signed my name this 20th day of November, 1929.

FRIEDRICH FELIX.